(No Model.)
C. BIRKERY.
VALVE.
No. 515,703. Patented Feb. 27, 1894.
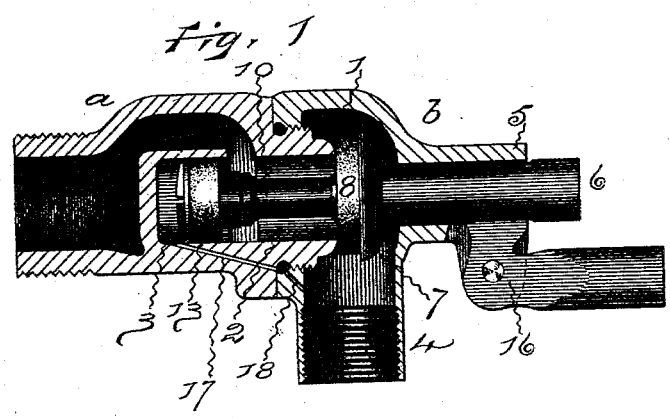
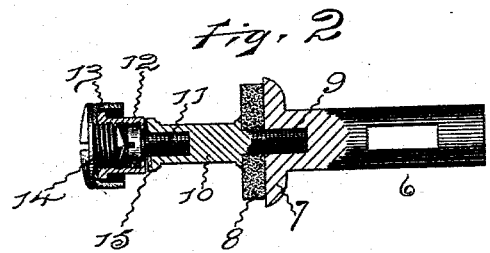
Witnesses:
E. Buckland.
A. L. Pease
Inventor:
Cornelius Birkery
by
Harry R. Williams,
Atty.

UNITED STATES PATENT OFFICE.

CORNELIUS BIRKERY, OF HARTFORD, CONNECTICUT, ASSIGNOR TO THE BIRKERY MANUFACTURING COMPANY, OF SAME PLACE.

VALVE.

SPECIFICATION forming part of Letters Patent No. 515,703, dated February 27, 1894.

Application filed July 31, 1893. Serial No. 481,914. (No model.)

*To all whom it may concern:*

Be it known that I, CORNELIUS BIRKERY, a citizen of the United States, residing at Hartford, in the county of Hartford and State of Connecticut, have invented certain new and useful Improvements in Valves, of which the following is a full, clear, and exact specification.

The invention relates more particularly to the class of tank valves or ball cocks which are balanced so as to open gradually with, and shut easily against the pressure of the water, whereby a large port may be employed and the cock used with high as well as low pressures without singing or hammering.

The object of the invention is to so construct such a valve that the parts can be made interchangeable and the cost very much reduced, while the arrangement is such that the parts are easily assembled and sure in operation.

To this end the invention resides in details of the construction of a valve of the class described by me in my Patent No. 476,511, as more particularly hereinafter described and pointed out in the claim.

Referring to the accompanying drawings:— Figure 1 is a central longitudinal section of the valve. Fig. 2 is a central section of the valve, spindle and balance piston.

In the views, the shell of the valve is made in two parts, $a$, and $b$, one having a threaded portion around the port, while the other has a threaded recess adapted to be screwed upon the threaded portion around the port. The disk-seat 1 is formed on the part $a$, at the end of the port 2, and in the chamber on the pressure side of the port is located a piston cylinder 3 that opens at one end into the chamber on the pressure side of the port. An outlet bib 4 is formed on the part $b$, for the escape of the fluid, and a hub 5 is also formed on the part $b$ in line with the port, this hub having a perforation for supporting the spindle 6. This spindle which is loosely supported in the hub, has an enlarged flanged end 7 in the interior of the shell, and secured to this flanged end is a disk, 8, of leather, asbestus, soft metal or other substance suitable for making a tight joint with the seat when the disk is closed.

The interior end of the spindle has a threaded socket, and into this is screwed the threaded stem 9, of a stud 10, the end of which has a threaded recess, 11.

In the piston cylinder 3, is a piston consisting of a cup shaped head 12, with a cup packing, 13, of leather or other suitable material, which is held to the head by means of a screw, 14, that fits the threaded interior of the head. This piston, which fits the cylinder closely, is loosely held to the stud, 10, projecting from the spindle in front of the seat disk, by means of a screw 15 that passes through a perforation in the bottom of the cup shaped head, into the threaded socket 11 in the end of the stud. The perforation through the piston head is smaller than the screw head, so the piston cannot be removed, but is larger than the shank of the screw allowing the piston a free rotation and also a small movement sidewise on the screw in any direction, so that the piston while held to the spindle and movable longitudinally with it has an independent universal lateral motion. The outer end of the spindle is provided with a mortise into which projects the end of the bent lever 16 to which the float rod bearing the customary float, can be attached. A small channel, 17 is made from the piston cylinder back of the piston through the walls of the part $a$, and in continuation of a channel 18 in the part $b$, so that any water which leaks back of the piston can escape through the outlet bib.

By means of the construction described, a balanced valve having a large port with a correspondingly large disk which opens gradually with and shuts firmly against high pressures with no singing or hammering, can be very cheaply produced and made to operate with a small float. As the balancing piston in the cylinder is connected with the spindle, so as to have a universal lateral movement, it does not bind if the walls of the cylinder are not in exact line with the perforation in the hub on the part $b$, or on entrance of any sediment into the cylinder. The parts work easily and do not wear out. On account of this it is not so essential that the parts be made very accurate, but they can be made in quantities, interchangeable and require no special fitting for each valve. The piston can be readily taken off by removing the screws, and one of a different size substituted if it is desired to reduce or enlarge the surface of the balancing piston, the walls of the cylinder then being bored larger, or reduced by inserting a lining tube so that the cock can with facility, be made to balance properly, under varying pressures to which it is subjected in different systems.

I claim as my invention—

A valve consisting of a shell formed in parts, having a water-way with a port, a seat around the port, a piston cylinder supported in the water-way upon the pressure side of the port, and open to the pressure, an outlet bib and a spindle supporting hub; a spindle supported by the hub on the escape side of the valve, a disk borne by the spindle and adapted to move toward and from the seat around the port, a stud secured to the spindle, a piston movable in the piston chamber upon the pressure side of the port and open to the pressure in an opposite direction to the disk, said piston held to the stud against longitudinal movement but having a free transverse movement on the end of the stud, substantially as specified.

CORNELIUS BIRKERY.

Witnesses:
H. R. WILLIAMS,
C. E. BUCKLAND.